United States Patent [19]

Arendt et al.

[11] 4,201,76

[45] May 6, 198

[54] MOLTEN SALT SYNTHESIS OF LITHIUM META-ALUMINATE POWDER

[75] Inventors: Ronald H. Arendt; Matthew J. Curran, both of Schenectady, N.Y.

[73] Assignee: General Electric Company, Schenectady, N.Y.

[21] Appl. No.: 8,734

[22] Filed: Feb. 2, 1979

[51] Int. Cl.² .............................................. C01F 7/04
[52] U.S. Cl. ........................... 423/600; 423/DIG. 12
[58] Field of Search ............... 423/596, 600, DIG. 12, 423/593

[56] References Cited

U.S. PATENT DOCUMENTS

| | | | |
|---|---|---|---|
| 3,509,057 | 4/1970 | Greger | 423/600 |
| 3,711,397 | 1/1973 | Martinsons | 423/600 |
| 3,793,443 | 2/1974 | Arendt | 423/594 |
| 4,152,280 | 5/1979 | Arendt et al. | 423/DIG. 12 |
| 4,152,281 | 5/1979 | Arendt et al. | 423/DIG. 1 |

OTHER PUBLICATIONS

Sooki–Toth et al., "Chem. Abstracts", vol. 8. #212097a, 1975.

*Primary Examiner*—Herbert T. Carter
*Attorney, Agent, or Firm*—Jane M. Binkowski; James C Davis, Jr.; Leo I. MaLossi

[57] ABSTRACT

A particulate mixture of an alkali chloride solvent sal a lithium salt reactant selected from the group consis ing of lithium hydroxide, lithium nitrate, lithium cai bonate and mixtures thereof, and an aluminum salt reac tant selected from the group consisting of aluminur hydroxide, alpha-alumina, gamma-alumina and mi> tures thereof is heated to melt the chloride salt solver in which the lithium and aluminum salt reactants dis solve and react precipitating lithium meta-aluminate.

7 Claims, No Drawings

MOLTEN SALT SYNTHESIS OF LITHIUM META-ALUMINATE POWDER

The present invention relates to the preparation of small crystallite size, stoichiometric, phase pure lithium meta-aluminate, $LiAlO_2$. One of the potentially significant technological applications of this material is as the support medium for the molten alkali carbonate electrolyte in carbonaceous gas fueled primary batteries. The support medium is typically an unsintered mass of fine particles residing between the battery anode and cathode structures. This support medium acts to retain, via capillary action, the electrically active molten salt between the cell electrodes, thereby alleviating the need to physically anchor the electrodes as rigidly as would be required with a pure liquid electrolyte system. Ideally, the requirements on this support medium are that it be chemically inert toward the electrolyte, electrode materials, and reactant and product gases. Further, this material should be inherently chemically stable; i.e., a single, well-defined chemical compound rather than a mixture of compounds which could undergo reaction under service conditions.

Initial experiments with molten carbonate primary cells used MgO as the support medium. For various reasons, cell performance was found to improve with $Al_2O_3$ as the support medium. However, $Al_2O_3$ was observed to be converted to $LiAlO_2$ during unavoidable excursions of the partial pressure of $CO_2$ to low values, hence $LiAlO_2$ is now the material of choice to support the molten electrolyte.

The conventional method of preparation of $LiAlO_2$ is the solid state reaction of well mixed crystallites of $Li_2CO_3$ and $Al_2O_3$ followed by milling to the desired particle size. Improved homogeneity can be attained through the use of sophisticated, and costly, preparation techniques for the reactant mixture, but a solid state reaction is still employed, and milling to desired particle size is required. The inherent nature of solid state reactions requires sufficiently high temperature to give reasonable mobilities to allow reaction. Even at these temperatures, unreasonably long times are required to achieve a completely stoichiometric product. Generally, reaction is stopped before complete reaction is attained; therefore the product is contaminated with unreacted material. The contamination is increased by addition of abraded grinding medium during the milling process to the desired particle size. Although it is in principle possible to remove second phase $Li_2O$ or $LiOH$, $Al_2O_3$ is too refractory and inert to be separated from the $LiAlO_2$. Hence, an irreversible contamination results.

Another prior art method of preparing lithium meta-aluminate is by reacting lithium carbonate and aluminum oxide in a molten electrolyte solvent comprised of lithium carbonate and potassium carbonate. The disadvantage of this prior art method is that as a practical matter the lithium meta-aluminate is not separated from the carbonate solvent and the carbonate phase is then compositionally altered to form the required fuel cell electrolyte. In contrast, the present invention utilizes a fugitive solvent which enables the production of phase-pure lithium meta-aluminate.

The present invention circumvents the inadequacies of the prior art processes by a liquid phase reaction scheme utilizing a molten salt solvent with subsequent precipitation of the product which does not require comminution. In the present process, the reactants a slightly soluble in the molten salt solvent therefo allowing literally atomic mixing in the liquid phase the reactants. The solubility of the reactants is such tl it exceeds the corresponding solubility of the lithiu meta-aluminate in the present molten salt solve Hence, the observed product precipitates spontar ously from the moltent salt solution. The reactants w continually dissolve to maintain a reactant-saturat solution until they are totally consumed by produ formation.

Preferably, the reaction temperature in the prese process is that required to attain reasonable reacti rates in the molten salt solvent, and it can be signi cantly lower than in the corresponding convention solid state synthesis. Similarly, the reaction time can as short as about 30 minutes or shorter compared wi many hours for solid state reaction.

The present process produces lithium meta-alumina of stoichiometric composition. Since the present cry tals of lithium meta-aluminate are produced by preci] tation from a saturated solution, they are chemical homogeneous, i.e. they are of uniform composition on microscopic level. Also, since the individual crystals lithium meta-aluminate range up to about 1 micron size and are generally submicron, they do not requi any crushing or grinding operations with their atte dant contamination with impurities from the equipme employed.

Briefly stated, the present process for producing lit ium meta-aluminate comprises providing a particula lithium salt reactant selected from the group consistir of lithium hydroxide, lithium nitrate, lithium carbona and mixtures thereof, providing a particulate aluminu salt reactant selected from the group consisting of al minum hydroxide, alpha-alumina, gamma-alumina, ar mixtures thereof, providing an alkali chloride salt sc vent selected from the group consisting of sodium chl ride, potassium chloride, lithium chloride and mixtur thereof, forming a particulate mixture of said lithiu salt reactant, said aluminum salt reactant and said chl ride salt solvent, said lithium salt reactant and said al minum salt reactant being present in at least stoichi metric amount, said chloride salt solvent being prese in an amount of at least about 20% by weight of tl total amount of said reactants and said chloride sal heating said particulate mixture to a reaction temper ture at least sufficient to melt said chloride salt b lower than the temperature at which said lithium met aluminate decomposes, said chloride salt in molten for being a solvent for said reactants, maintaining said rea tion temperature, dissolving and reacting said reactan in said molten salt and precipitating lithium meta-alum nate, and recovering said precipitated lithium met aluminate. Alternatively, particulate precursors for tl reactants can be used, and such precursors normally a hydrates of the reactants.

Lithium meta-aluminate has the formula $LiAlO$ Examples of the reaction for producing $LiAlO_2$ in tl present process are as follows:

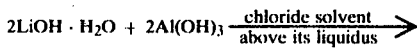

$$2LiAlO_2 + 6H_2O$$

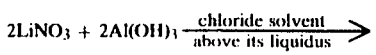

-continued

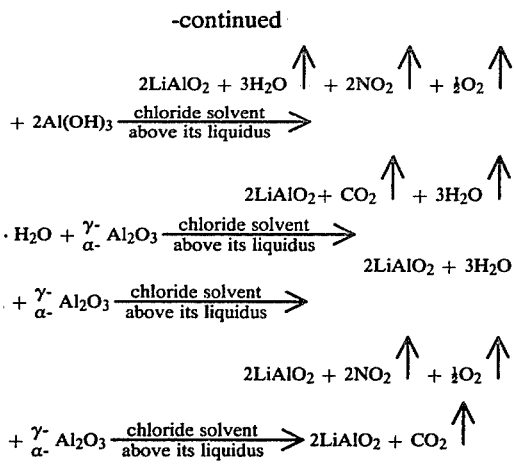

vever, when used in stoichiometric amounts, very
igh mixing is required to achieve complete reac-
Therefore, to guarantee complete conversion of
imina reactant, the lithium reactant is used in an
it in excess of stoichiometric, up to about 10
t % in excess, and preferably about 2 weight % in
of stoichiometric. Amounts of the lithium reac-
excess of 10 weight % of stoichiometric provide
nificant advantage. Any excess lithium reactant
may remain in the product is easily removed
vater.
arrying out the present process, the reactants or
sors therefor can be of commercial or technical
and their particular purity depends largely on the
ilar application of the resulting $LiAlO_2$ powder.
ically, the reactants or precursors therefor should
ntain any impurities which would have a signifi-
deleterious effect on the resulting $LiAlO_2$ pow-
on its particular application.
reactants or precursors therefor should be of a
hich allows the reaction to take place. Generally,
eactants or precursors therefor are used and are
ctory in the particle size range in which they are
le commercially, which ordinarily ranges from
:ron up to about 100 microns. The reactant pow-
lould also be free of large, hard aggregates, i.e.
antly above 100 microns, which might survive
ixing process and prevent sufficient reactant
t for satisfactory reaction rates.
le present process the alkali chloride salt solvent
:ted from the group consisting of sodium chlo-
otassium chloride, lithium chloride and mixtures
f. The chloride salt solvent is used in a minimum
t of at least about 20% by weight of the total
t of reactants and chloride salt solvent. Amounts
ride salt lower than about 20% by weight are not
al since the desired reaction will not proceed to
tion. It is a requirement for complete reaction
e reactants be accessible to each other through
ilten solvent under the material transport con-
; imposed by the mixed solid-liquid reaction sys-
here is no upper critical maximum amount of
le salt, but amounts of chloride salt higher than
)0% by weight of the total amount of reactants
loride salt solvent provide no significant advan-
is the amount of chloride salt or salt mixture is
ed from 20% by weight to about 70% by weight,
ount of individual crystals or particles present in
sulting $LiAlO_2$ powder increases correspond-
ind with an amount of chloride salt or salt mix-
ture above about 75% by weight, substantially all or all
of the $LiAlO_2$ powder recovered consists essentially of
individual grains or crystallites.

The reactants or precursors therefor and the alkali
chloride salt solvent are admixed to produce a substan-
tially thorough mixture to insure good contact and
complete reaction. The actual mixing operation can be
carried out in several ways which do not introduce
undesirable impurities into the resulting $LiAlO_2$ pow-
der, such as, for example, using a plastic or ceramic
milling medium. For example, small ~0.10 kg product,
samples can be mixed by tumbling of the components in
a plastic jar. Larger samples, in units of 0.750 kg of
product, are most conveniently mixed by dry milling in
a 6.0 liter, all $\alpha$-$Al_2O_3$ jar mill for a minimum of 15
minutes. The milling also serves to break down any
reactant/solvent material agglomerates and reduce all
materials to comparable particle sizes, aiding overall
homogeneity. Wet milling and/or mixing can be used
but offer no significant benefit over the dry milling.

The particular reaction temperature used depends
largely on the chloride salt used and the reaction rate
desired, i.e. rate of precipitation of lithium meta-alumi-
nate desired. Generally, the higher the reaction temper-
ature, the faster is the reaction rate. In molten form, the
present chloride salt is a solvent for the reactants and
the minimum reaction temperature is the temperature at
which the chloride salt or salt mixture melts and for
sodium chloride alone it is about 1073° K. (800° C.), for
potassium chloride alone it is about 1063° K. (790° C.),
and for lithium chloride alone it is about 996° K. (723°
C.). All mixtures of sodium chloride and potassium
chloride and/or lithium chloride form a mixture which
melts at a temperature below the melting point of so-
dium chloride alone and thus, for the eutectic mixture of
50 mole % potassium chloride —50 mole % sodium
chloride the melting point or liquidus temperature, i.e.
the minimum reaction temperature, is 931° K. (658° C.),
for the binary 75 mole % LiCl —25 mole % NaCl mix-
ture the liquidus or minimum reaction temperature is
550° C., for the binary 58 mole % LiCl —42 mole %
KCl mixture the liquidus or minimum reaction tempera-
ture is 355° C. and for the ternary 54 mole % LiCl —9
mole % NaCl —37 mole % KCl eutectic mixture the
liquidus or minimum reaction temperature is ~350°
C.–400° C.

Preferably, in the present invention, the minimum
reaction temperature is at least about 10° K. above the
melting point of the chloride salt or salt mixture since
such a temperature insures complete melting of chloride
salt and also increases the fluidity of the molten salt
producing increased wetting of the reaction mixture.
However, the maximum reaction temperature is always
below the decomposition point of the lithium meta-
aluminate being precipitated, which is approximately
1173° K. (900° C.). Gold or gold-lined, or $\alpha$-$Al_2O_3$
crucibles are examples of suitable reaction vessels.

The charge is heated in an air atmosphere at any
convenient rate. At reaction temperature the chloride
salt melts and the reactants dissolve and react in the
molten salt precipitating lithium meta-aluminate. The
reaction temperature is maintained until the reaction is
completed.

The particular period of reaction time depends
largely on reaction temperature as well as the amount of
chloride salt used and is determined empirically. When
the reaction is completed, the reacted mass is cooled at any convenient rate, preferably in air and preferably to about room temperature. It is generally observed that the reacted mass has contracted in volume and has parted substantially from the crucible walls, facilitating its removal. Should bonding to the crucible occur, the reacted mass can be loosened with, for example, a distilled $H_2O$ wash in a plastic receiver.

The cooled $LiAlO_2$-containing reacted mass is a solid, brick-like in texture and hardness, comprised of $LiAlO_2$ particles distributed throughout a matrix of solidified chloride salt and any excess lithium reactant and separating the precipitated lithium meta-aluminate from the resulting salt solution. Water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine $LiAlO_2$ powder that contains no perceptibly agglomerated material, i.e. perceptible to the eye.

The $LiAlO_2$ powder can be recovered from the aqueous supernatant chloride solution by a number of techniques. For example, the $LiAlO_2$ powder can be recovered by decanting or filtrating the supernatant solution and drying the $LiAlO_2$ powder in air. The particular recovery technique depends on the impurities which may be present. Specifically, the supernatant solution will have a high ionic strength which will cause the $LiAlO_2$ powder to partially flocculate and settle when mixing is stopped. To facilitate a thorough settling, a flocculating agent which is organic and soluble in water, preferably an anionic flocculant, is added in an amount which is sufficient to completely flocculate and settle the lithium meta-aluminate powder. Preferably, the flocculating agent is added in aqueous solution, about 0.1 gram of flocculant per 100 grams of water usually being satisfactory, and preferably the flocculating agent is used only in an amount necessary to settle the powder. The settled powder, after decantation of the supernatant solution, is collected by filtration. Preferably, it is sparingly washed on the filter first with distilled water to insure removal of chloride salt and excess lithium reactant, and finally it is washed with a polar organic solvent such as ethanol or methanol to at least partially dehydrate the powder and prevent crystallite bonding. For production of an $LiAlO_2$ powder of high purity, the flocculating agent should be completely removable by heating the powder in air at temperatures below lithium aluminate's decomposition point, and preferably not higher than about 873K (600° C.) generally for about one hour.

In the present process, if desired, a particulate precursor, normally a hydrate, of any of the reactants, can be used. At or below the reaction temperature used, the precursor should decompose completely to form the reactant and by-product gas or gases leaving no contaminants in the reacted mass. The precursor should be used in an amount sufficient to produce the respective reactant in at least stoichiometric amount.

The present $LiAlO_2$ powder is white in color. The powder is free-flowing and can be in the form of aggregates or in the form of the individual powder crystals, or a mixture of both. The aggregates range in size from about 1 micron to about 20 microns, are particles consisting essentially of a cluster of smaller sized particles or crystals weakly bonded together autogeneously, i.e. such bonding is believed to be caused by Van de Waal's forces or by self-bonding, i.e. neck growth between grains. The individual powder cyrstals range up to about 1 micron in size and usually are submicron. The aggregates are friable and can easily be broken down with a rubber spatula, or in a mortar and pestle with gentle action, into a powder which will pass through 100 mesh nylon screen.

X-ray diffraction analysis of the as-produced LiAlO powder showed no phase other than lithium meta aluminate.

The present $LiAlO_2$ powder can be prepared free of impurities or free of significant impurities. Therefore when the same procedure is used, its properties are reproducible from batch to batch.

The present process can yield $\alpha$-, $\beta$- or $\gamma$-lithium meta-aluminate powder or mixtures thereof. It was determined experimentally that the Li-anion results in lithium meta-aluminate of different crystal structure and morphologies. In addition, there is some effect of temperature. These results are summarized as follows:

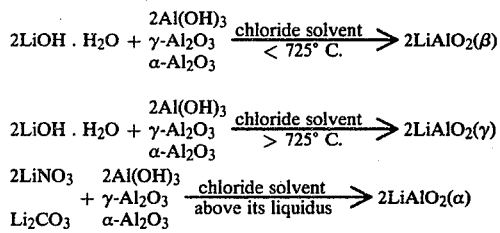

The invention is further illustrated by the following examples wherein the procedure was as follows unless otherwise noted:

The aluminum hydroxide and lithium hydroxide ranged in size up to about 100 microns.

The water used was distilled water.

EXAMPLES 1-6

The following procedure was used for Examples 1-6
1747.56 grams of $Al(OH)_3$, 973.92 grams of $LiOH.H_2O$ (2 wt. % excess of stoichiometric), 1500.0 grams of NaCl, 1913.46 grams of KCl were dry mixed by a 30 minute milling in an $\alpha$-$Al_2O_3$ ball mill. The particulate mixture was then placed in an $\alpha$-$Al_2O_3$ crucible covered with a porous $Al_2O_3$ plaque, and the charge was reacted at 660° C. for 2 hours in an air atmosphere and then allowed to cool to room temperature.

The reacted product was placed in about 8.4 liters of distilled water in a plastic vessel with a motor driven plastic coated stainless steel stirrer. After about 30 minutes of stirring, the product disintegrated completely into a fine powder.

50 ml. of an 0.1 wt % aqueous anionic flocculant solution was added to the slurry. The flocculant was a polyamide imide powder sold under the trademark Hercofloc 821.

When stirring was stopped, the powder was collected from the supernatant solution by decantation, then filtration. The powder on the filter was then washed with distilled water, then ethanol, recovered and dried in air The recovered powder was white in color and was free flowing.

ray analysis of the powder showed it to be phase-LiAlO$_2$. Quantitative x-ray analysis and surface measurement of the powder gave the following ts:

| | QUANTITATIVE X-RAY ANALYSIS, VOLUME % LiAlO$_2$ | | | B.E.T. SURFACE AREA |
|---|---|---|---|---|
| NO. | α | β | γ | METER GRAM$^{-1}$ |
| 1 | 14 | 72 | 14 | 6.11 |
| 2 | 8 | 80 | 12 | 7.38 |
| 3 | 11 | 72 | 17 | 6.43 |
| 4 | 12 | 74 | 14 | 5.70 |
| 5 | 10 | 75 | 15 | 6.89 |
| 6 | 10 | 77 | 13 | 5.18 | e B.E.T. surface area measurements indicate that individual crystals of the powder were 0.2–0.5 mi- in size.

EXAMPLE 7

00 grams of Al(OH)$_3$, 42.80 grams of LiOH.H$_2$O . % excess of stoichiometric), 65.92 grams of NaCl 4.09 grams of KCl were dry mixed by tumbling in c jar for 30 minutes. The particulate mixture was d in an α-Al$_2$O$_3$ crucible, covered with a porous 3 plaque, reacted at 815° C. for 60 minutes in an air sphere and cooled to room temperature. The pow- vas retrieved in the same manner as disclosed in iples 1–6.

e powder was white in color and free-flowing. ′ analysis showed it to be phase pure LiAlO$_2$ with najor phase being γ-LiAlO$_2$. B.E.T. measurement : powder showed it to have a surface area of 6.51 ·s$^2$ gram$^{-1}$.

EXAMPLE 8

23 grams of Al(OH)$_3$, 42.17 grams of LiOH.H$_2$O wt. % excess of stiochiometric), ~63.00 ml. =7) concentrated nitric acid, 65.92 grams NaCl, 4.09 grams KCl were wet mixed and then reduced /ness at 100°–200° C. in air resulting in the conver- )f lithium hydroxide to lithium nitrate. The partic- mixture was placed in an α-Al$_2$O$_3$ crucible, cov- with a porous Al$_2$O$_3$ plaque, and reacted at 660° C. hr. in an air atmosphere and cooled to room tem- ıre. The lithium meta-aluminate was retrieved in ıme manner disclosed in Examples 1–6.

e lithium meta-aluminate powder was white in and free-flowing. X-ray analysis showed it to be rised of α-LiAlO$_2$ and a minor amount of unre- γ-Al$_2$O$_3$. B.E.T. measurement of the powder ed it to have a surface area of ~55 meters$^2$ ;$^{-1}$.

EXAMPLE 9

)0 grams of Al(OH)$_3$, 38.03 grams of Li$_2$CO$_3$ (2 б excess of stoichiometric),65.92 grams of NaCl 4.09 grams of KCl were dry mixed by tumbling in ; jar for 30 minutes. The particulate mixture was ɿ in an α-Al$_2$O$_3$ crucible, covered with a porous ι plaque and reacted at 665° C. for one hour in an mosphere and cooled to room temperature. The n aluminate powder was retrieved in the same ɘr as disclosed in Examples 1–6.

: lithium meta-aluminate powder was white in and free-flowing. X-ray analysis of the powder ɘd it to be phase pure LiAlO$_2$ with the major phase α-LiAlO$_2$. B.E.T. measurement of the powder showed it to have a surface area of 25.12 meters$^2$ grams$^{-1}$.

EXAMPLE 10

76.23 grams of Al(OH)$_3$, 42.17 grams of LiOH.H$_2$O (0.5 wt. % excess of stoichiometric), 61.60 grams of LiCl, 14.15 grams of NaCl and 74.24 grams of KCl were wet mixed with water and dried in air at 100°–200° C. The particulate mixture was placed in an α-Al$_2$O$_3$ crucible, covered with a porous Al$_2$O$_3$ plaque and reacted at 400° C. for 1 hour in an air atmosphere. The lithium meta-aluminate powder was retrieved in the same manner disclosed in Examples 1–6.

The lithium meta-aluminate powder was white in color and free-flowing. X-ray analysis of the powder showed it to be phase pure LiAlO$_2$ with the major phase being β-LiAlO$_2$. B.E.T. measurement of the powder showed it to have a surface area of 11.10 meters$^2$ grams$^{-1}$.

EXAMPLE 11

A composition for use in molten carbonate fuel cell electrolytes was prepared as follows. One kilogram of finished electrolyte tile composition containing 45 weight percent lithium meta-aluminate produced in Example 6 and 55 weight percent of a mixture of 62 mole percent lithium carbonate and 38 mole percent potassium carbonate were dry mixed by tumbling in a gallon plastic jug for 2 hours. The particulate mixture was then placed in an open alpha alumina crucible and heated in air at 873 K for 2 hours. The product was then broken down in an alpha-alumina mortar and pestle to peanut-size aggregates and then milled in an alpha alumina ball mill for 15 minute intervals between which the —100 mesh material was collected. A total of six such millings were required to retrieve ~0.95 kg of the hot-pressing composition. Tiles were prepared by the conventional hot pressing comprising placing the hot pressing composition in a rectangular die and pressing at a pressure of about 3.45–10.34 MPa and a temperature 758 K(485° C.)

The total time for preparation of this tile was less than about 24 hours whereas conventional processing, where the lithium meta-aluminate is formed in situ with the lithium carbonate-potassium carbonate electrolyte, requires a factor of time three or four times greater.

One of the tiles prepared herein was inserted in a molten carbonate fuel cell and it performed equivalent to conventionally prepared materials.

In copending U.S. patent application Ser. No. 896,634, entitled "Molten Salt Synthesis Of Lead Zirconate Titanate Solid Solution Powder", filed Apr. 17, 1978 in the names of Ronald Henry Arendt and Joseph Henry Rosolowski, and incorporated herein by reference, there is disclosed that sodium chloride and/or potassium chloride is added to an aqueous suspension of the oxides of lead, titanium and zirconium and stirred until the suspension converts to a gel which is then heated evaporating the water and melting said chloride in which the oxides dissolve the react precipitating lead zirconate titanate.

What is claimed is:

1. A process for producing lithium meta-aluminate powder which consists essentially of forming a mixture of a particulate lithium salt reactant selected from the group consisting of lithium hydorxide, lithium nitrate, lithium carbonate and mixtures thereof in at least stoichiometric amount of particulate precursors for said lithium salt reactant, a particulate aluminum salt reactant selected from the group consisting of aluminum hydroxide, alpha-alumina, gamma-alumina and mixtures thereof in at least stoichiometric amount of particulate precursors for said aluminum salt reactant, and an alkali chloride salt selected from the group consisting of sodium chloride, potassium chloride, lithium chloride and mixtures thereof, said alkali chloride salt being used in an amount of at least about 20% by weight of the total amount of said reactants and said chloride salt, heating said mixture to a reaction temperature at least sufficient to melt said chloride salt, said precursors decomposing completely at or below said reaction temperature to form said reactant and by-product gas, said salt in molten form being a solvent for said reactants, maintaining said reaction temperature dissolving and reacting said reactants in said molten salt and precipitating said lithium meta-aluminate, and recovering said precipitated lithium meta-aluminate by dissolving said chloride salt and separating said precipitated lithium meta-aluminate from the resulting salt solution.

2. A process according to claim 1 wherein said amount of said lithium salt reactant is at about 2 weight % in excess of stoichiometric amount and wherein said precipitated lithium meta-aluminte is recovered by dissolving said chloride salt and excess lithium react and separating said precipitated lithium meta-alumin from the resulting solution.

3. A process according to claim 1 wherein said ch ride salt is a mixture comprised of 50 mole % sodi chloride and 50 mole % potassium chloride, and s reaction temperature is a minimum of about 658° C.

4. A process according to claim 1 wherein said chl ride salt is a mixture comprised of 75 mole % lithi chloride and 25 mole % sodium chloride, and said rea tion temperature is a minimum of about 550° C.

5. A process according to claim 1 wherein said chl ride salt is a mixture comprised of 58 mole % lithi chloride and 42 mole % potassium chloride, and sa reaction temperature is a minimum of about 355° C.

6. A process according to claim 1 wherein said chl ride salt is a mixture comprised of 54 mole % lithi chloride, 9 mole % sodium chloride and 37 mole potassium chloride, and the minimum reaction tempe ture is about 350° C. to 400° C.

7. A process according to claim 1 wherein said pi cursors are hydrates.

* * * * *